W. A. Fenn,
Butter Dish,

No. 78,366. Patented May 26, 1868.

Witnesses;
J. H. Shumway
A. J. Tibbits

Inventor,
Wm A. Fenn

By his Attorney
John E. Earle

United States Patent Office.

WILLIAM A. FENN, OF WEST MERIDEN, CONNECTICUT.

*Letters Patent No. 78,366, dated May 26, 1868.*

IMPROVEMENT IN COVERED DISHES.

*The Schedule referred to in these Letters Patent and making part of the same.*

TO ALL WHOM IT MAY CONCERN:

Be it known that I, WILLIAM A. FENN, of West Meriden, in the county of New Haven, and State of Connecticut, have invented a new Improvement in Revolving Covered Dishes; and I do hereby declare the following, when taken in connection with the accompanying drawings, and the letters of reference marked thereon, to be a full, clear, and exact description of the same, and which said drawings constitute part of this specification, and represent, in—

Figure 1:
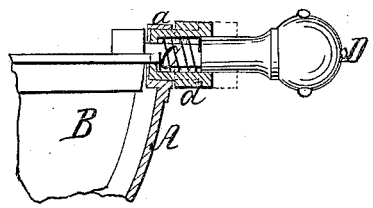
Figure 2:
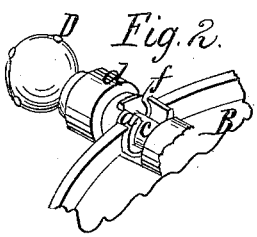
Figure 3:
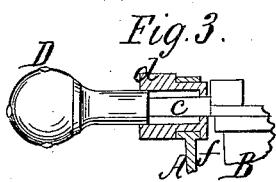

Figure 1, a longitudinal sectional view of a portion of a dish, illustrating my improvement in the construction of the bearings; and, in Figures 2 and 3, views of a different modification of the same.

This invention relates more particularly to an improvement in what are commonly called "revolving covered butter-dishes," but is alike applicable to other uses, the object being to form the joint or bearing so that, while it may be easily disconnected intentionally, it cannot be accidentally disconnected, and consists in the arrangement, upon the trunnion of the cover, of a sleeve, which said sleeve fits the bearing on the dish, the said bearing being formed with an open slot, so that the trunnion may pass freely therethrough; and, when so passed through, the sleeve on the trunnion is slipped into the bearing, thereby practically increasing the size of the trunnion, so that it cannot pass out through the said slot; and the said sleeve provided with a means of being secured into its position in the bearing, and yet so that, when it is desired to remove the cover, the sleeve may be moved, on the trunnion, back out of the bearing, thus permitting the trunnion to be lifted through the slot in the bearing.

In order that others may construct my improvement, I will fully describe the same, as illustrated in the accompanying drawings.

A is the outer casing of the dish; B, the cover turned down. In the upper edge of the outer part, A, in the usual position, is formed a bearing, $a$, with a slot of less width than the diameter of the bearing, and opening therefrom, as seen in fig. 2. Upon the said cover, a trunnion, C, is formed, extending out, to form a convenient handle, D, for turning the cover, in similar manner as common covered dishes, the said trunnion being of about the diameter of the width of the slot which opens into the bearing, so that the said trunnion will pass freely through the said slot. Over the said trunnion, and fitting upon the enlarged portion of the handle outside the trunnion, I arrange a sleeve, $d$, the inner end of the said sleeve fitting the trunnion, as seen in fig. 1, and so that the said sleeve may be moved back upon the trunnion, as denoted in red, fig. 1. Therefore, when the sleeve is so moved back, the cover is placed in its position, the trunnion passing through the slot, into the bearing. Then the said sleeve, which fills the bearing, is moved forward, on the trunnion, into the bearing, as denoted in fig. 1, and thus closes the slot, to prevent the removal of the trunnion from the bearing.

If desired to remove the cover, withdraw the sleeve from the bearing, as denoted in red, fig. 1. Then the trunnion is free to be passed out through the slot of the bearing.

It is important that some means be adopted to secure the sleeve in the bearing. A convenient method I illustrate in fig. 1, by the introduction of a spring, over the trunnion, within the sleeve, which, bearing against the sleeve, and against the shoulder formed by the enlarged part for the handle, tends to hold the sleeve over the trunnion.

Another device for thus holding the sleeve I illustrate in figs. 2 and 3, in which I form, upon the inner end of the sleeve, a projecting lug, $f$, (see fig. 2,) so as to pass freely through the slot in the bearing; and, when it has so passed through, the sleeve may be turned to the right or left, turning the lug down to one side of the bearing, so as to prevent its accidental withdrawal. In this construction, to remove the cover, simply turn the sleeve until the lug $f$ corresponds to the opposite slot; then withdraw the sleeve, as before described.

Though specially adapted for application to covered dishes, this invention may be alike employed, with equal advantage, for other purposes.

Having thus fully described my invention, what I claim as new and useful, and desire to secure by Letters Patent, is—

The arrangement of the sleeve $d$ upon the trunnion C, and combined with a bearing, $a$, which said bearing is provided with an open slot, the whole constructed and arranged to operate in the manner set forth.

WM. A. FENN.

Witnesses:
J. H. SHUMWAY,
A. J. TIBBITS.